United States Patent [19]

Wilkes et al.

[11] Patent Number: 5,131,075
[45] Date of Patent: Jul. 14, 1992

[54] MERGED TEXT AND GRAPHICS PRINTING METHOD

[75] Inventors: David C. Wilkes; Mark J. DiVittorio, both of Vancouver, Wash.; Brian E. Cripe, Corvallis, Oreg.; Gary K. Cutler, Battle Ground, Wash.

[73] Assignee: Hewlett-Packard Company, Palo Alto, Calif.

[21] Appl. No.: 683,567

[22] Filed: Apr. 9, 1991

Related U.S. Application Data

[63] Continuation of Ser. No. 316,898, Feb. 27, 1989, abandoned.

[51] Int. Cl.⁵ ............................................. G06K 15/00
[52] U.S. Cl. ..................................... 395/105; 395/108
[58] Field of Search ............... 364/518, 519, 523, 900; 395/105-108, 110-111

[56] References Cited

U.S. PATENT DOCUMENTS

| 4,623,978 | 11/1986 | Aoki ..................................... 364/519 |
| 4,718,784 | 1/1988 | Drisko ........................... 364/519 X |
| 4,896,275 | 1/1990 | Jackson ............................... 364/519 |
| 4,933,875 | 6/1990 | Kojima ................................ 364/519 |

FOREIGN PATENT DOCUMENTS

| 0123109 | 10/1984 | European Pat. Off. ............ 364/523 |
| 0127745 | 12/1984 | European Pat. Off. ............ 364/519 |

Primary Examiner—Gary V. Harkcom
Assistant Examiner—Michael A. Jaffe

[57] ABSTRACT

The invented merged text and graphics printing method includes software which effects the printing of merged text and graphics by looking ahead and recognizing the position of text, effecting the printing of any graphics up to such text, then effecting the printing of the text. By looking ahead and recognizing the position of text, the method can determine when such text should be printed in relation to the graphics.

8 Claims, 3 Drawing Sheets

MERGED TEXT AND GRAPHICS PRINTING METHOD

CROSS REFERENCE TO RELATED APPLICATIONS

This is a continuation of Ser. No. 07/316,898, filed on Feb. 37, 1989 now abandoned.

TECHNICAL FIELD

This invention relates to a method of printing merged text and graphics and, more particularly, to software which looks ahead to detect merged text and graphics. By looking ahead, the method is able to integrate properly the merged text and graphics.

BACKGROUND ART

Merged text and graphics refers to text positioned beside or superposed over part of a graphics image. In other words, merged text and graphics denotes text and parts of graphics images which have the same vertical position relative to a page.

Page printers print merged text and graphics by storing the data describing the entire merged text and graphics image in memory, addressing each piece of data, and then printing the entire page. Accordingly, the order in which a host computer sends the data to a printer is unimportant. However, page printers require substantial memory.

To print merged text and graphics on a serial or scanning printhead printer, the data must be sorted by vertical position or by address. However, such printers usually have limited memory. When printing merged text and graphics, the printer's memory may fill up before the merged text and graphics is fully sorted. If, in such a case, the printer has received data defining part of a graphics image, the printer may have to print a part of the image in order to make room in memory for incoming text data. Accordingly, if the incoming text data is addressed to a prior position, the text character will be misplaced unless the printer can back up the paper.

To allow serial and scanning printhead printers to print merged text and graphics, the page on which the image is to be printed may be feed through the printer twice. The printer prints either the text or the graphics first, and subsequently prints the other. However, refeeding paper is cumbersome and results in poor printer throughput.

This invention provides a method whereby merged text and graphics may be printed by a page, serial or scanning printhead printer without requiring the memory necessary for full page addressing, and without the necessity of creating separate graphics and text documents or re-feeding paper through the printer. This invention may also be used in conjunction with an invention of Mark D. Lund for a Bidirectional Graphics Printing Method, assigned to Hewlett-Packard and described in a copending U.S. patent application, Ser. No. 07/299,105, filed Jan. 19, 1989.

DISCLOSURE OF THE INVENTION

The invented merged text and graphics printing method includes software which allows merged text and graphics to be printed without full page addressing or re-feeding paper. This is accomplished by looking ahead and recognizing the position of text, effecting the printing of any graphics up to such text, then effecting the printing of the text. By looking ahead and recognizing the position of text, the method can determine when such text should be printed in relation to the graphics.

DETAILED DESCRIPTION AND BEST MODE FOR CARRYING OUT THE INVENTION

Figure 1:
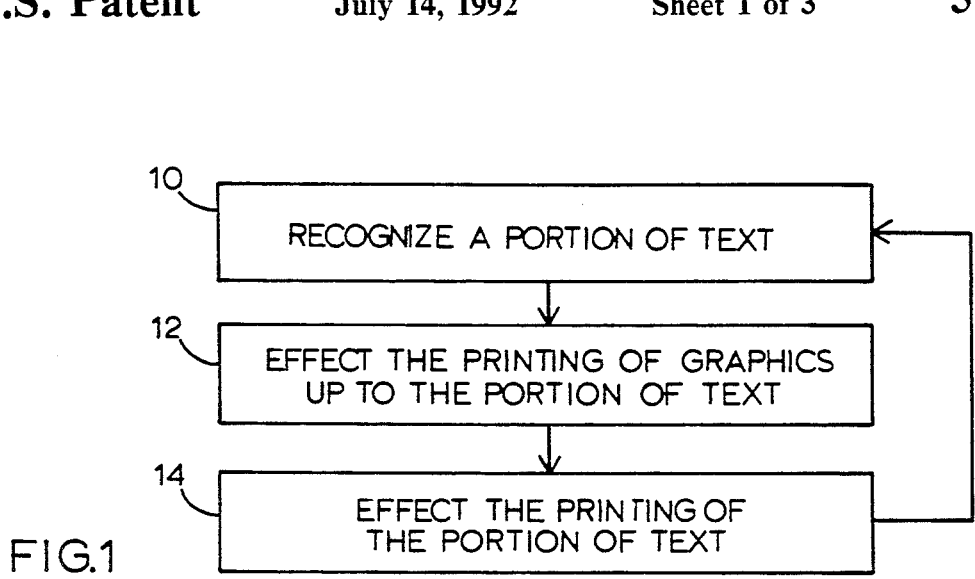
FIG. 1 is a block diagram of the general steps of the invented method.

FIG. 1 outlines the general steps of the invented merged text and graphics printing method. Initially, the method looks ahead and recognizes a portion of text to be printed, as shown by box 10. Typically, the text is intended to be printed on a page and the step of recognizing means to locate the next line of text to be printed on the page.

When a portion of text has been recognized, the method effects the printing of graphics up to the portion of text, as illustrated by block 12. For example, if the first line of text to be printed is addressed to a position approximately four inches down a page, the invented method would effect the printing of any graphics images up to the recognized text.

The invented method is typically performed by a printer driver located in a host computer. Accordingly, the phrase "effects the printing" means to send the data to be printed to a printer. The printer may then buffer the data and print in when appropriate.

At step 14, the invented method effects the printing of the recognized portion of text. The method then returns to step 10 and recognizes another portion of text.

Looking ahead to recognize text permits a printer to buffer a portion of the entire text rather than the entire text. Accordingly, more graphics information may be stored by the printer, thereby increasing printer throughput.

Figure 2:
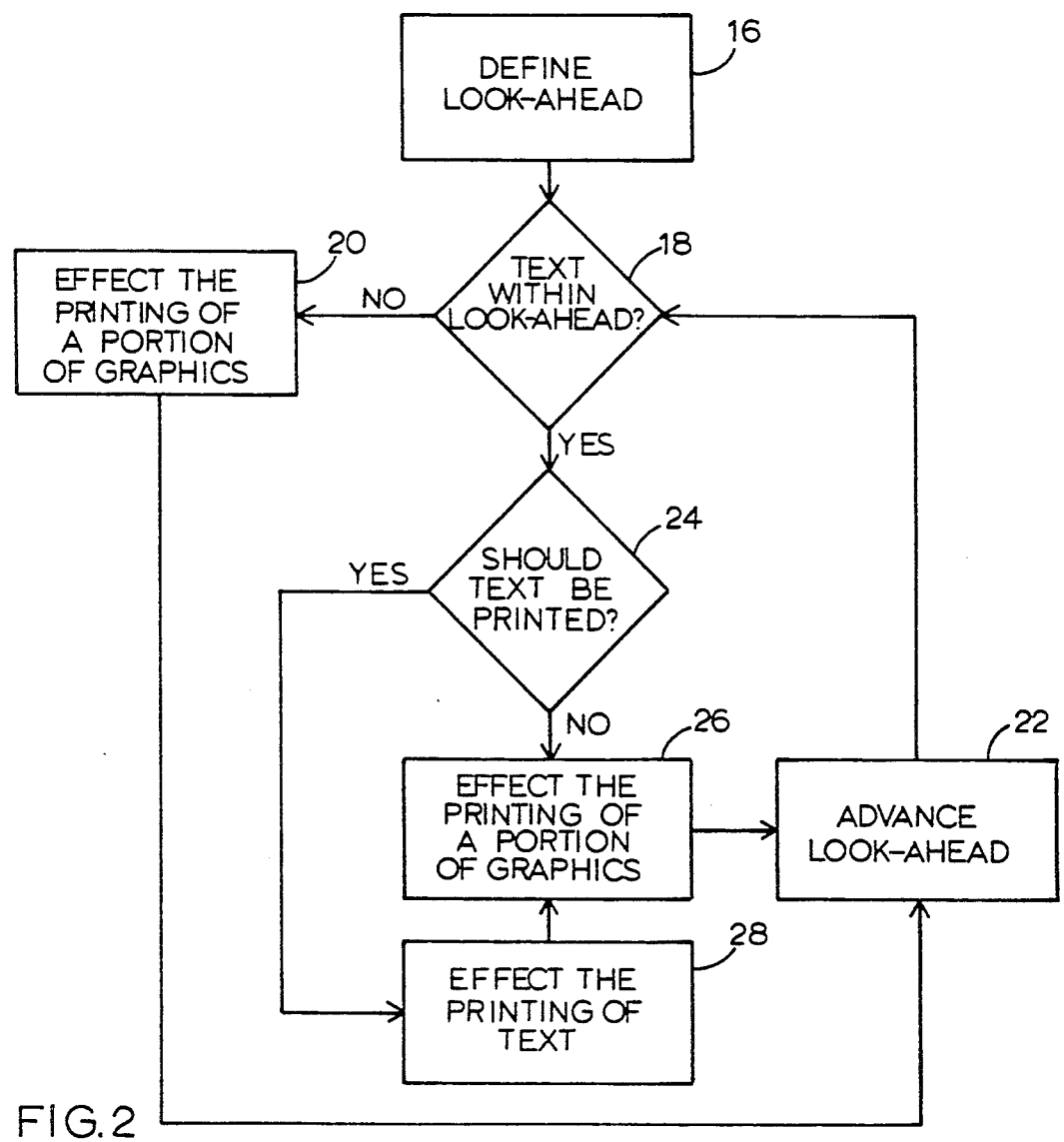
FIG. 2 is a block diagram outlining specific steps in the invented method.

FIG. 2 outlines the invented method in more detail. Initially, at step 16, the method defines a look-ahead region. The look-ahead region is a specified area within which the invented method will recognize the position of text. In other words, the look-ahead region is the specified amount of data the method will review before effecting the printing of any graphics or text.

The look-ahead region may be thought of as an area having a fixed vertical dimension and a horizontal dimension corresponding to the width of the page on which the image is to be printed. The top boundary of the region is located at the current raster row of the image. Typically, the vertical dimension of the look-ahead region is equal to the vertical dimension of the largest text character which may be printed by a specific printer.

The method, at step 18, first scans the look-ahead region to detect whether any text is located therein. If text is not located within the region, then the method effects the printing of a portion of graphics, as shown in step 20. The look-ahead region is then advanced at step 22, and the method determines whether any text is within the advanced look-ahead region.

When text is detected within the region, the method determines whether it should be sent to the printer, as shown in step 24. In a system using a page printer, the determination may be made by computing whether any text is within a predetermined distance from the beginning of the look-ahead region, In a system using a scanning printhead printer, the determination may be made as disclosed in the discussion concerning steps 38, 40, and 42 of FIG. 3

If text should not be sent to the printer, the method effects the printing of a portion of graphics at step 26, advances the look-ahead region at step 22, and repeats steps 18 and 24. If the method determines that text should be sent to the printer, then the method effects the printing of the text, as shown in step 28. The method then effects the printing of the next portion of graphics at block 26, and the look ahead region is advanced at step 22. The method then repeats by beginning with step 18.

Figure 3:
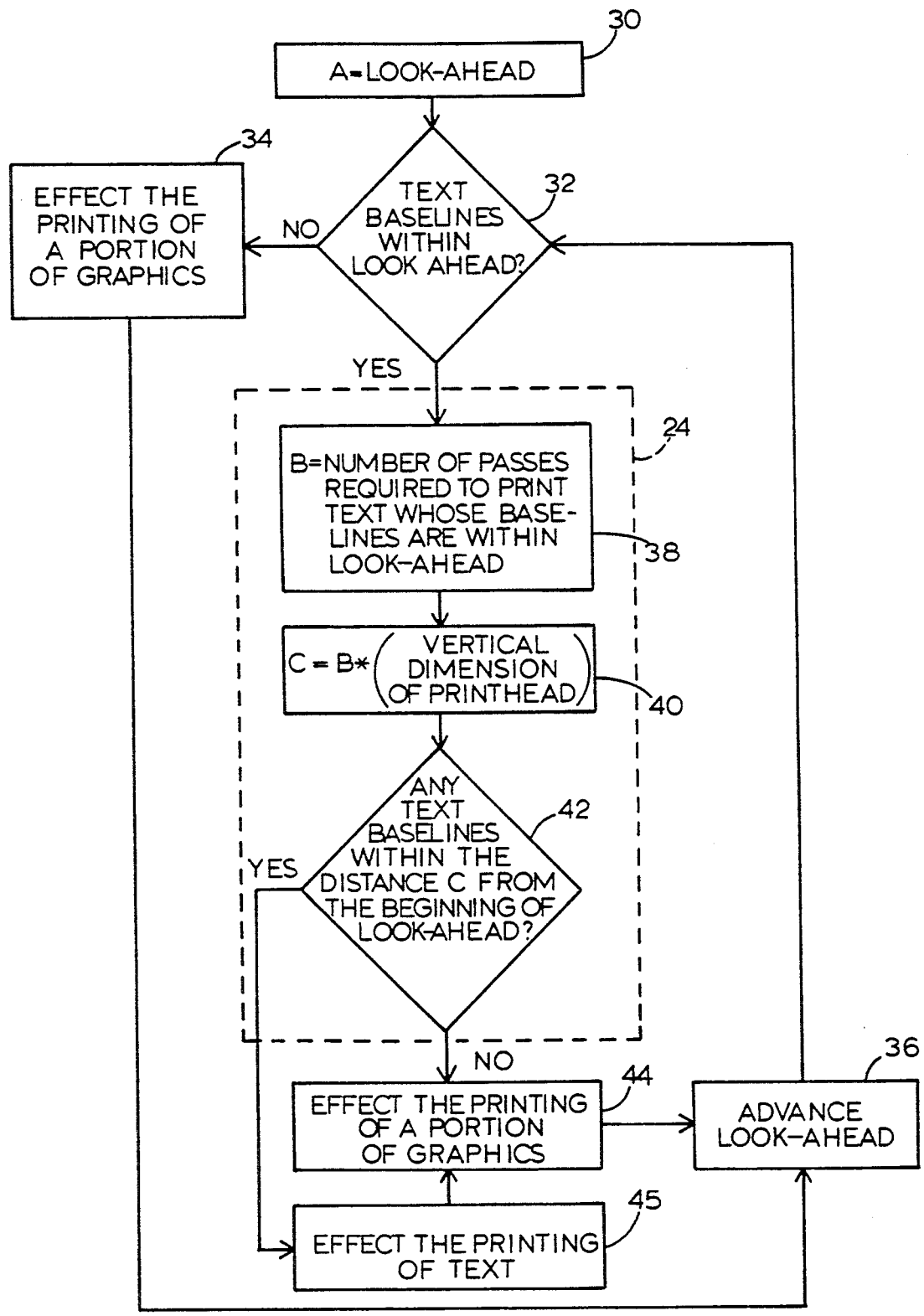
FIG. 3 is a block diagram of the invented method used in a scanning printhead printer.

FIG. 3 is a block diagram of the invented merged text and graphics printing method used in a scanning printhead printer. Specifically, FIG. 3 sets forth step 24 of FIG. 2 in more detail.

Again, the method defines a look-ahead region, as illustrated by block 30. The method then determines whether any text is within the region, as shown at step 32. Specifically, the method detects whether any text baselines are located within the look-ahead region. A text baseline is the imaginary line on which text sits.

If no text baselines are detected within the region, then, at step 34, the method effects the printing of a portion of graphics. According to preferred practice, the method effects the printing of one graphics raster row. Step 36 then advances the look-ahead region by an amount equal to the effected portion of graphics, typically one raster row. The method then recommences with step 32.

When a text baseline is detected within the look-ahead region, the method proceeds with steps 38, 40 and 42. These three steps correspond to step 24 in FIG. 2.

Step 38 recognizes the number of printhead passes required to print text whose baselines are within the look-ahead region. Step 40 multiplies the number of passes by the vertical dimension of the printhead. The product of the multiplication defines what is referred to as a text output box. The text output box has a vertical dimension equal to the product of the multiplication in step 40, measured from the top of the look-ahead region. The width of the text output box is equal to the width of the look-ahead region.

Next, step 42 determines whether any text baselines are located within the text output box. If not, the method effects the printing of a portion of graphics at step 44. Again, one graphics raster row is preferably sent to the printer. The method then advances the look-ahead region at step 36, and recommences with step 32.

If, at step 42, text baselines are detected within the text output box, then the method effects the printing of text at step 45, and proceeds to step 44. In other words, at step 45 the method sends the text whose baseline is within the text-output box to the printer, and then at step 44, the method sends the next graphics raster row.

The method then advances the look-ahead region, at step 36, and recommences with step 32. The method repeats until the entire image containing merged text and graphics has been sent to the printer.

OPERATION

Figure 4:
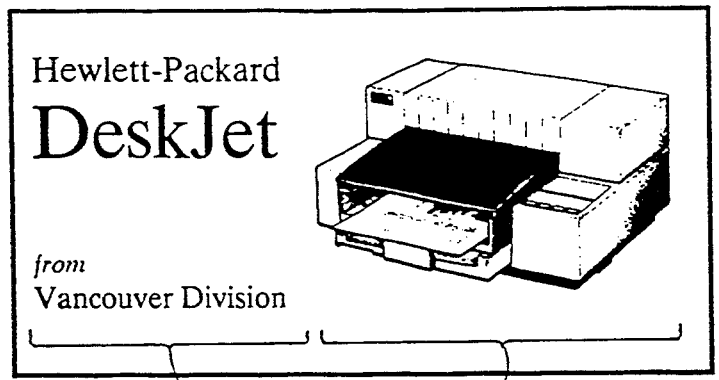
FIGS. 4 through 7 illustrate the operation of the invented method in a system using a scanning printhead printer.
Figure 5:
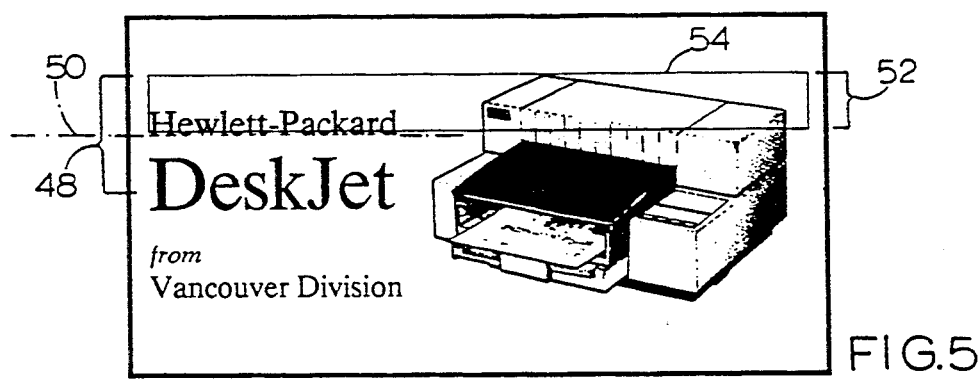
Figure 6:
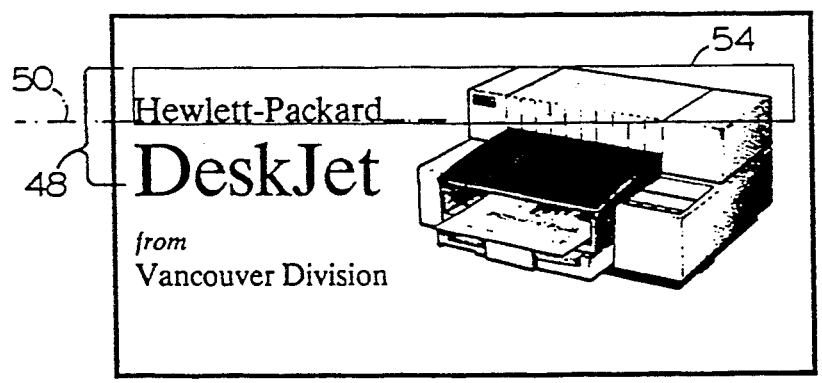
Figure 7:
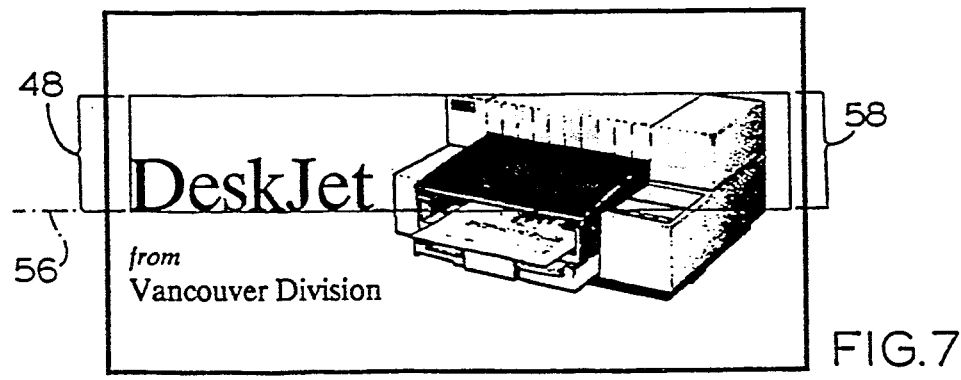

FIG. 4 depicts an image of merged text 46 and graphics 47 to be sent to a printer. The text and graphics are merged because graphics are located beside text. FIGS. 5 through 7 illustrate the operation of the invented method in a system using a scanning printhead printer, such as Hewlett-Packard's DeskJet printer.

Specifically, FIGS. 5 through 7 show successive steps of the invented method. Text or graphics which is depicted in FIG. 4, but missing in FIGS. 6, 7 is text or graphics which has been sent to a printer.

FIG. 5 shows a look-ahead region 48 at the first raster row of graphics image 47. The vertical dimension of the region is ⅓-inch, the vertical size of the largest text character that the DeskJet printer can print.

After setting the look-ahead region, the method detects whether any text baselines are within the region. FIG. 5 shows one imaginary text baseline 50 within region 48. Baseline 50 is associated with text which can be printed in one pass of the printhead, in other words a one-pass font. Accordingly, the method multiplies 1 by the vertical dimension of the printhead, 1/6-inch for the DeskJet printer. The resulting product defines the vertical dimension 52 of a text output box 54.

As shown in FIG. 5, baseline 50 in not within box 54. Thus, the method does not send the text to the printer, but instead sends the data describing the next raster row of graphics. The method then advances region 48 by one raster row. The method repeats the above-disclosed steps until baseline 50 is within box 54.

FIG. 6 shows region 48 advanced and baseline 50 within box 54. There is still only one text baseline within region 48, therefore box 54 has the same vertical dimension as in FIG. 5. Because baseline 50 is within box 54, the method will send the text associated with baseline 50 to the printer. The text will have the correct positioning information so that the printer will print the text when necessary.

The method then sends the next graphics raster row to the printer and advances region 48. The method then repeats until another text baseline is within region 48.

FIG. 7 shows baseline 56 within region 48. FIG. 7 only shows the part of the initial image which has not been sent to the printer. The text associated with baseline 56 is a two-pass font, so text output box 58 has the same vertical dimension as region 48.

At this point, the method sends the text associated with baseline 56 to the printer. Subsequently, the method sends raster rows of graphics data until another baseline appears within region 48. The method repeats until the entire image to be printed has been seen.

INDUSTRIAL APPLICABILITY

The invented merged text and graphics printing method is applicable to many printing systems. Its application increases the throughput of a printer by only requiring that a portion of an image to be printed on a page be buffered. In other words, full page addressing is not longer required and the amount of random access memory needed within a printer is decreased.

While the best mode and preferred embodiment of the invention have been described herein, variations and changes may be made without departing from the spirit of the invention.

What is claimed is:

1. A computer-based method for printing merged text and graphics on a page, the method comprising:

defining a look-ahead region including at least one line of text or at least one raster row of graphics, where a line of text or raster row of graphics is all text or graphics information, respectively, with the same vertical position on the page;

determining whether any text is within the look-ahead region;

if not, printing at least one raster row of graphics encountered in the look-ahead region, advancing the look-ahead region, then repeating the steps of determining, printing at least one raster row of graphics and advancing until text is within the look-ahead region;

if text is within the look-ahead region, then calculating, by using a predetermined calculation process, the text should be printed, and if so printing the text and advancing the look-ahead region, but if not, printing at least one raster row of graphics encountered in the look-ahead region, and repeating the steps of calculating, printing at least one raster row of graphics and advancing until the text is printed; and repeating the above-listed steps until all text and graphics has been printed.

2. The method of claim 1, employed in a printing system including a printer having a scanning printhead with a defined vertical dimension, wherein the predetermined calculation process includes computing the number of printhead passes required to print the text, multiplying that number by the vertical dimension of the printhead, and determining that the text should be printed if the entire vertical dimension of the text is within the distance defined by the product of the multiplication measured from the beginning of the look-ahead region.

3. The method of claim 1, employed in a page printer, wherein the predetermined calculation process includes computing whether the text is within a predetermined distance measured from the beginning of the look-ahead region, and if so, determining that the text should be printed.

4. A computer-based method for printing merged text and graphics on a page, wherein text is arranged into lines and graphics is arranged into raster rows, the method comprising:

defining a look-ahead region including at least one line of text or at least one raster row of graphics;

determining whether any text baseline is within the look-ahead region;

if not, printing the next graphics raster row, advancing the look-ahead region, then repeating the steps of determining, printing the next graphics raster row and advancing until a text baseline is within the look-ahead region;

if a text baseline is within the look-ahead region, then calculating, by using a predetermined calculation process, whether the line of text associated with the text baseline should be printed, and if so, printing the line of text and advancing the look-ahead region, but if not, printing the next graphics raster row, advancing the look-ahead region, and repeating the steps of calculating, printing the next graphics raster row and advancing until the text should be printed; and repeating the above-listed steps until all text and graphics has been printed.

5. The method of claim 4, employed by a computer system, wherein the look-ahead region has a vertical dimension and the step of defining includes setting the vertical dimension of the look-ahead region equal to the vertical dimension of the largest text character which may be printed by the computer system employing the method.

6. The method of claim 4, wherein the step of advancing includes moving the look-ahead region ahead one raster row of graphics.

7. The method of claim 4, employed in a printing system including a printer having a scanning printhead with a defined vertical dimension, wherein the predetermined calculation process includes computing the number of printhead passes required to print the line of text associated with the text baseline, multiplying that number by the vertical dimension of the printhead, and determining that the line of text associated with the text baseline should be printed if the text baseline is within the distance defined by the product of the multiplication measured from the beginning of the look-ahead region.

8. The method of claim 4, employed in a page printer, wherein the predetermined calculation process includes computing whether the line of text associated with the text baseline is within a predetermined distance measured from the beginning of the look-ahead region, and if so, determining that the line of text associated with the text baseline should be printed.

* * * * *